United States Patent
Koum et al.

(10) Patent No.: US 10,367,892 B2
(45) Date of Patent: *Jul. 30, 2019

(54) SYSTEM AND METHOD FOR AGGREGATING COMMUNICATION CONNECTIONS

(71) Applicant: WhatsApp Inc., Mountain View, CA (US)

(72) Inventors: Jan Koum, Santa Clara, CA (US); Bryan D. O'Connor, Santa Clara, CA (US); Brian Acton, Santa Clara, CA (US)

(73) Assignee: WHATSAPP INC., Menlo Park, CA (US)

(*) Notice: Subject to any disclaimer, the term of this patent is extended or adjusted under 35 U.S.C. 154(b) by 191 days.

This patent is subject to a terminal disclaimer.

(21) Appl. No.: 15/277,953

(22) Filed: Sep. 27, 2016

(65) Prior Publication Data

US 2017/0019484 A1  Jan. 19, 2017

Related U.S. Application Data

(63) Continuation of application No. 13/782,690, filed on Mar. 1, 2013, now Pat. No. 9,503,485.

(51) Int. Cl.
  *H04L 29/08* (2006.01)
  *H04L 29/06* (2006.01)

(52) U.S. Cl.
  CPC ........ *H04L 67/141* (2013.01); *H04L 65/1046* (2013.01); *H04L 65/1063* (2013.01);
  (Continued)

(58) Field of Classification Search
  CPC ............. H04L 65/1063; H04L 65/1069; H04L 47/10; H04L 67/141; H04L 67/26;
  (Continued)

(56) References Cited

U.S. PATENT DOCUMENTS

| 7,062,465 B1 * | 6/2006 | Shafiee | H04L 63/04 |
| | | | 235/380 |
| 7,426,181 B1 * | 9/2008 | Feroz | H04L 47/10 |
| | | | 370/230 |

(Continued)

*Primary Examiner* — Ramy M Osman

(57) ABSTRACT

A system and methods are provided for aggregating communication connections. Multiple users connect to a system (e.g., a web-based system) that hosts an application or service for exchanging communications. Users who exchange communications among themselves may be considered "associates." When one user who is on-line with the application sends a communication through the system for an associate, the system determines whether the associate is on-line or off-line. If the associate is off-line, the system crafts and sends toward the associate a notification regarding the communication, including an address of the communication server to which the one user is connected. When the associate's device receives the notification, the application may attempt to connect to the specified address. In this way associated users' connections will aggregate or gravitate toward the same communication server, thereby eliminating the latency and cost of exchanging users' communications between multiple communication servers.

15 Claims, 3 Drawing Sheets

(52) U.S. Cl.
CPC .......... *H04L 65/1069* (2013.01); *H04L 67/10* (2013.01); *H04L 67/26* (2013.01); *H04L 67/2833* (2013.01); *H04L 67/42* (2013.01)

(58) Field of Classification Search
CPC ..... H04L 67/10; H04L 67/2833; H04L 67/42; H04L 65/1046
See application file for complete search history.

(56) References Cited

U.S. PATENT DOCUMENTS

| | | | | |
|---|---|---|---|---|
| 8,923,491 | B2* | 12/2014 | MacWan | G06F 3/167 379/88.01 |
| 9,503,485 | B1* | 11/2016 | Koum | H04L 65/1069 |
| 9,652,738 | B2* | 5/2017 | Bentley | H04L 65/403 |
| 2005/0014490 | A1* | 1/2005 | Desai | H04L 51/24 455/416 |
| 2005/0233737 | A1* | 10/2005 | Lin | H04L 51/04 455/416 |
| 2006/0195519 | A1* | 8/2006 | Slater | H04L 12/1822 709/204 |
| 2006/0239212 | A1* | 10/2006 | Pirzada | H04M 3/424 370/260 |
| 2009/0323554 | A1* | 12/2009 | Arisoylu | H04L 12/5692 370/254 |
| 2010/0296418 | A1* | 11/2010 | You | H04L 65/4038 370/261 |
| 2011/0264464 | A1* | 10/2011 | Fonger | G06F 19/00 705/3 |
| 2013/0077539 | A1* | 3/2013 | Averill | H04L 12/1818 370/261 |
| 2013/0179941 | A1* | 7/2013 | McGloin | H04L 12/1818 726/3 |
| 2017/0019484 | A1* | 1/2017 | Koum | H04L 65/1063 |

* cited by examiner

SYSTEM AND METHOD FOR AGGREGATING COMMUNICATION CONNECTIONS

CROSS-REFERENCE TO RELATED APPLICATION

This application is a continuation of, claims the benefit of and priority to previously filed U.S. patent application Ser. No. 13/782,690 filed Mar. 1, 2013, entitled "SYSTEM AND METHOD FOR AGGREGATING COMMUNICATION CONNECTIONS", which is hereby incorporated by reference in its entirety.

BACKGROUND

This invention relates to the field of communications. More particularly, a system and methods are provided for aggregating communication connections of multiple users of a common application or service.

Web-based applications and services are characterized by thousands or even millions of communication connections for those that are the most popular and successful. Each user connects separately to the system that hosts the application, and his or her connection may be terminated at any of multiple servers or front-ends. Because each such server is configured to support use of the application or service, it usually does not matter to a particular user which server he or she is connected to.

If the system that hosts the application or service supports the exchange of communications among users, such as via instant messaging, electronic mail, file sharing or some other function, a communication generated by one user connected to one server will usually need to be routed through the system to a different server to which the target user is connected. The more users the system hosts, and the more communications those users exchange, the more time and resources must be expended supporting their communications. Any network or other communication links for interconnecting system components may become saturated if enough users are on-line.

In addition, routing user-to-user communications may require checking the destination users' statuses (e.g., on-line or off-line), determining where their connections are terminated, identifying communication paths to those termination points and routing the communications accordingly. This processing adds latency, in addition to tying up system resources.

SUMMARY

In some embodiments of the invention, a system and methods are provided for aggregating associated users' communication connections. In these embodiments, users connect to a system that hosts an application or service that supports inter-user communications. Associated users are users who exchange communications among themselves.

In these embodiments, when a user comes on-line to the system and is associated with another user who is already on-line, his or her communication connection is steered to and terminated at the same server or front-end component that is maintaining the on-line user's connection. Therefore, any communications they exchange will not need to be routed between different front-end components.

In some embodiments of the invention, to facilitate aggregation, when a communication (e.g., an instant message, a chat message, electronic mail message) is received for a user who is off-line, an alert or wake-up message is dispatched toward a communication device operated by the user. Within that alert is an address to which the user's device should connect in order to retrieve the communication. If the sender of that communication is on-line, or if another recipient of the communication is on-line (e.g., in the case of a group chat message), the address identified to the device may be an address of the front-end system component that maintains the on-line user's connection.

When the user connects to the system to retrieve the communication that generated the alert, he or she will be connected to the same front-end component as an associate, thereby facilitating further communications between them and avoiding the need to use additional system resources to deliver their communications.

If an off-line user comes on-line when multiple associates are on-line and connected to different front-end components, his connection may be steered to any of those components. In some implementations, his connection will be directed toward the component that is hosting more associates than any other component, or to the component that hosts associates engaged in the busiest communication session (e.g., a chat session that is very active). In other implementations, the termination point for his connection may be selected in some other manner.

Multiple addresses may be identified in the alert message, with different addresses (e.g., different IP address and port combinations) corresponding to different communication protocols supported by the system component having the addresses.

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a system and methods are provided for aggregating user connections with a system that hosts an application (or service). In these embodiments, the application supports communications exchanged between the users, such as instant messages, electronic mail, audio and/or video content, or some other form of communication. The users access the system and the application using devices such as smart phones, tablet computers, notebooks and/or other computing or communication devices that have processors and that are capable of executing the application.

In these embodiments, instead of connecting to the system in a manner primarily intended to promote even distribution of user connections, users are steered toward system components (e.g., communication servers) hosting connections with the users' associates that are already on-line. Thus, instead of randomly connecting to one of multiple system servers (or addresses) provided by a DNS (Domain Name System or Domain Name Service) lookup, or applying a round-robin scheme or other "fair" distribution plan, a user may be connected to the same server that an associate is connected to.

Associates are users that exchange communications among themselves. Thus, in a group chat session or online conference, all participants are associates of each other with regard to that session or conference. For a private chat session (i.e., a one-on-one instant message session) or an electronic mail exchange between two users, those two will be the only associates related to the private chat session or electronic mail thread.

Figure 1:
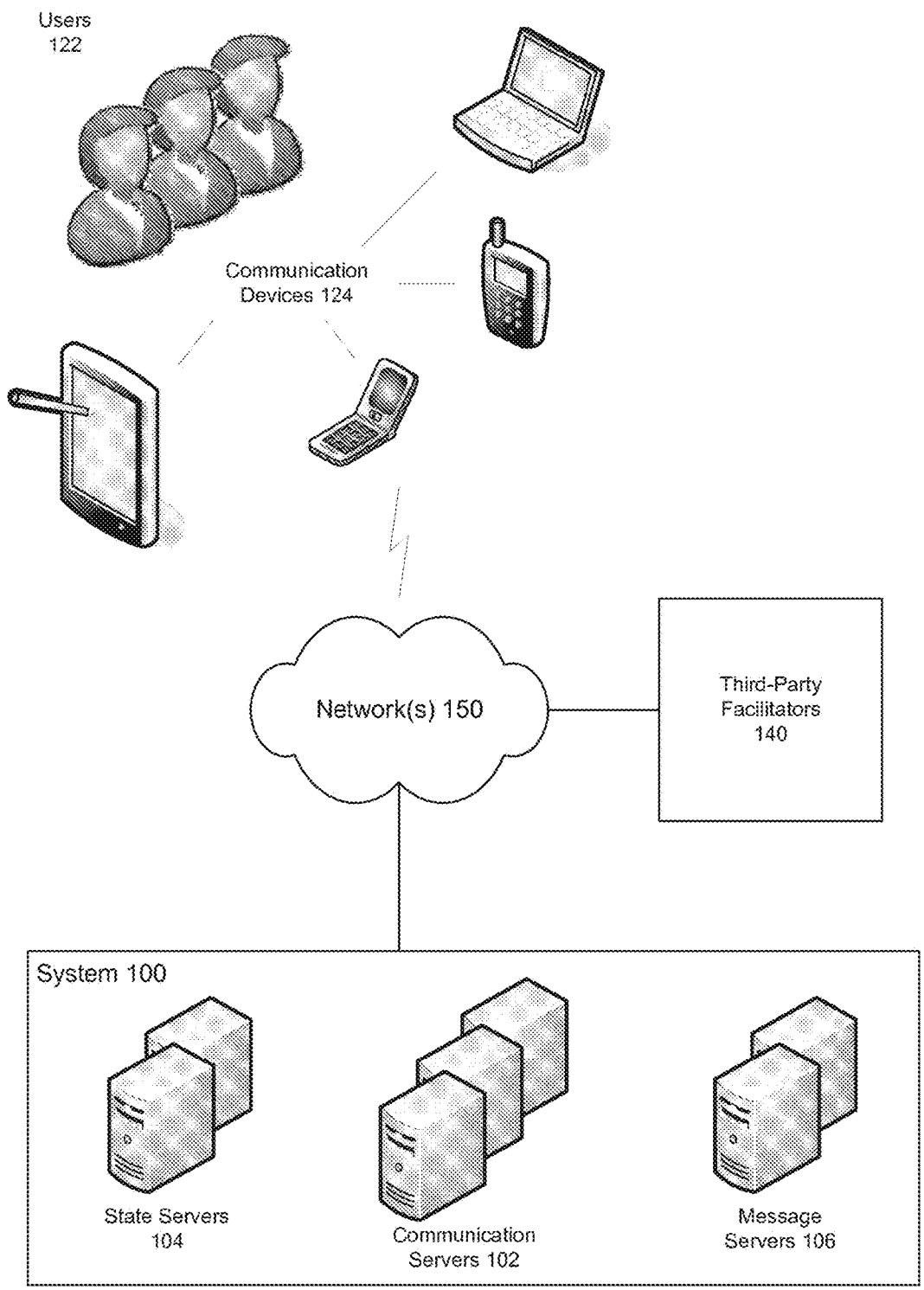
FIG. 1 is a block diagram depicting a communication environment in which some embodiments of the invention may be implemented.

FIG. 1 is a diagram of a communication environment in which some embodiments of the invention may be implemented. In these embodiments, users 122 operate any of a variety of communication devices 124. Devices 124 may include smart phones running virtually any operating system (e.g., Android, BlackBerry, iOS, Nokia S40, Symbian, Windows Phone), tablet computers, other mobile computers, workstations, etc.

System 100 is a data center, computer network or other amalgamation of computer resources for hosting a communication application or service (or a server portion of a communication application) used by multiple users (e.g., users 122). In some implementations, the application provides a user with instant messaging of text, audio, photos, video and multimedia from his or her communication device (e.g., a device 124), with one or more other users.

The application is compatible with various devices 124 and includes client application logic that is executed under the devices' native operating systems. A user operating one type of device and subscribing to one communication server provider can exchange messages with users operating other types of devices and subscribing to other communication service providers. Individual messages may be sent to any number of recipients, and a group form of communication (e.g., chat) is offered in which multiple users interactively exchange instant messages.

Communication servers 102 are front-end components of system 100 that host users' connections with the system and that facilitate the exchange of communications between users. Servers 102 may be referred to as "chat" servers, in that they receive instant messages and chat session communications from individual users for delivery to one or more other users.

Illustratively, as long as a user is on-line with system 100 and the application is executing (e.g., in the foreground of the device), a connection or session may be maintained between the user's device and a communication server 102. When the user closes the application on the device, his or her connection may persist for some period of time (e.g., five minutes, fifteen minutes).

State servers 104 maintain states or statuses of users and/or users' devices. Thus, a state server stores some or all of a user's profile, including applicable preferences (e.g., preferred audible and/or visual alert), device type/model, etc. State servers 104 also identify users' telephone service providers, and store information necessary for pushing communications to a user's device where necessary, such as a device token needed to communicate with the device via the applicable third-party. This device token may also or alternatively be known as a "device URI (Uniform Resource Identifier)," a "registration id," a "pin" or may have some other moniker.

Message servers 106 store communications that cannot immediately be delivered to their target or destination users. A new message received for a user who is currently on-line with system 100 can be delivered immediately (i.e., through the user's open connection with a communication server 102). A message received for a user who is currently off-line (e.g., does not have an open connection with a communication server 102) may be stored on a message server 106 until it can be delivered.

Other components of system 100 are omitted from FIG. 1 for the sake of clarity. For example, the system may include other entities for registering new users, storing users' contacts (e.g., address books), synchronizing a user's contacts among multiple devices and/or with other users, converting content (e.g., a video, a photograph) from one form or format to another, monitoring communications for undesirable content (e.g., spam, malware, pornography), and so on.

Information identifying termination points of online users' connections with system 100 may be stored on communication servers 102, state servers 104 and/or other entities (e.g., a session server (not depicted in FIG. 1)). For example, each communication server may maintain a table or other data structure identifying users whose connections with the system are terminated at or hosted by that server. Another entity (e.g., a state server 104, a session server) may store a larger dataset that identifies, for every user connected to the system, which communication server maintains their connection.

Thus, when a communication server receives a new communication from a connected user, for one or more other users, it may perform a lookup within local data and/or data stored on another system entity in order to find out if the other users are connected and, if so, where. In some implementations, it will first search a local data table (e.g., a routing table), and only issue a query to another component if some or all destination users' statuses are not found locally.

Any number (e.g., one or more) of communication servers, state servers, message servers and/or other servers may be deployed within system 100. The functions of servers 102, 104, 106 may be distributed differently in other embodiments, such as by being merged into fewer servers or divided among additional servers.

The servers of system 100 may be separate physical computers comprising hardware resources (e.g., processor, storage, communication interface) and software resources (e.g., program code, data) suitable for performing the functions ascribed to them. In some alternative embodiments, servers 102, 104, 106 may be virtual computing machines that share hardware and/or software resources. Thus, multiple software server modules performing different functions may reside on one computer.

Third-party facilitators 140 include communication service providers, manufacturers and/or device providers that relay wake-up messages from system 100 to particular communication devices. Whereas some devices can be woken directly by system 100 when the device is quiescent or the application hosted by system 100 and operated on the device is off-line, others cannot. For the latter type of devices, and as described below, system 100 issues a message to a third-party facilitator that can send a message to the device to cause it to wake up.

Network(s) 150 comprise communication paths between devices 124, system 100 and third-party facilitators 140, and may include data and/or voice communication channels. For carrying data communications, networks 150 may comprise the Internet, one or more intranets, LANs (Local Area Networks), WANs (Wide Area Networks) and/or other point-to-point or distributed connections, which may be wired and/or wireless in nature. For carrying voice communications, network(s) 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO) and so on.

Networks 150 may thus comprise various entities not shown in FIG. 1, such as routers, gateways, switches, base stations (e.g., wireless access points, Node Bs, Evolved Node Bs) and/or other equipment for establishing, maintaining, switching or otherwise manipulating a data and/or voice connection.

Figure 2:
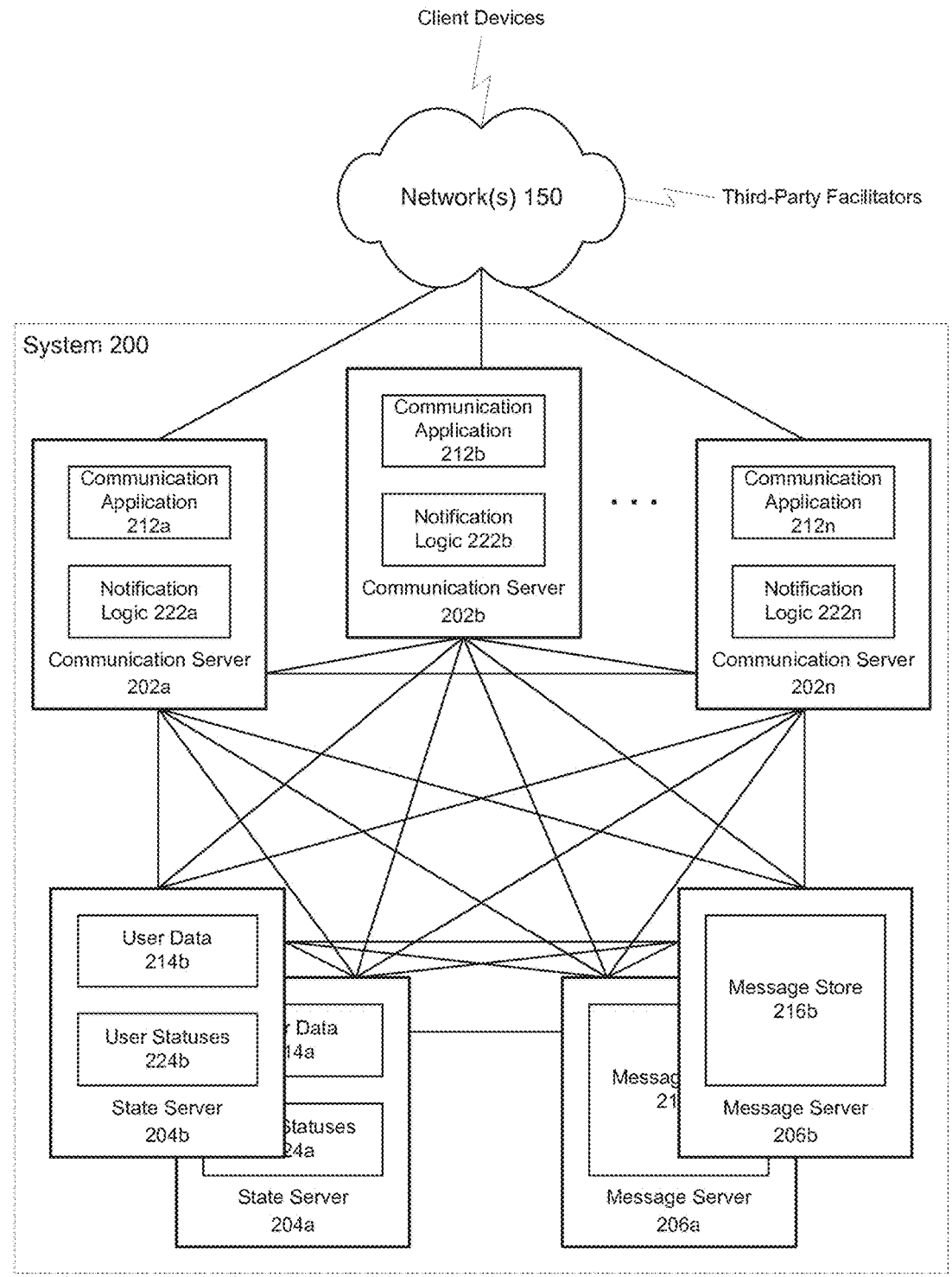
FIG. 2 is a block diagram of a system for aggregating communication connections, in accordance with some embodiments of the invention.

FIG. 2 is a block diagram of a system for aggregating users' communication connections, according to some embodiments of the invention.

In these embodiments, system 200 includes one or more of each of communication server 202 (e.g., servers 202a through 202n), state server 204 (e.g., servers 204a, 204b) and message server 206 (e.g., servers 206a, 206b). Communication server 202 includes a server version or counterpart 212 of a communication application operated by users of compatible client devices, and also includes notification logic 222. As described above, application 212 facilitates the exchange of communications and content between users. Logic 222 initiates alerts or notifications to devices regarding new communications addressed to users of the devices.

As described above, logic 222 is configured to retrieve (e.g., from a state server 204) data for configuring and issuing an alert or wake-up message to a client device that is off-line from system 200, possibly via a third-party facilitator. The alert, if it regards a communication from an on-line user, will include one or more addresses/ports and/or other indicia identifying a communication server 202 (or other system component) the device should connect to when it comes on-line with the system. The alert may also include a portion of the communication, instructions to the device regarding an audible sound to make, content to display, a physical sensation to initiate (e.g., vibration) and/or other information.

State server 204 includes user data 214 and user statuses 224. In these embodiments of the invention, user data 214 stores information that allows system 200 to send a message to a communication device of a user of system 200. Therefore, a user's data may include information about his or her device, such as type/model, telephone number, service provider, network address (e.g., IP or Internet Protocol address) and a device token issued by a manufacturer or provider of a user's device that allows system 200 to send a message to the device. The user's data may also include one or more user preferences (e.g., preferred notification tone or sound, preferred notification format), profile information, etc.

User statuses 224 indicate whether a given user is on-line or off-line with regard to system 200 and, if on-line, identify which communication server 102 the user is connected to. In other implementations, user statuses and/or termination points of their connections are stored on a different system component.

In some embodiments of the invention in which system 200 comprises multiple state servers, the state servers share data. In these embodiments, data indicating how to contact a user (or a user's device) is replicated across all state servers, thereby allowing any of them to answer a query from a communication server regarding how to communicate with a given device or a given user's device. The replicated data thus includes the user's device type/model, service provider, device token, network address and/or other information the system may need in order to contact a device (e.g., to wake it up) directly or through a third-party facilitator.

Message server 206 includes message store 216 for storing messages for off-line users. As the users come on-line and connect to a communication server, their messages are retrieved from storage and delivered to the users.

Because different devices handle alerts and notifications differently, servers 202, 204, 206 may store different information and/or operate in different manners for notifications for different users. As introduced above, some communication devices can be woken directly by system 200 when the application is dormant on the devices; waking others requires action by a third-party facilitator.

For the former, a communication server can transmit an alert or wake-up message directly toward a client device, using the device's telephone number, network address or other routing data. For the latter, the alert is passed to the appropriate third-party facilitator for transmission toward the client device.

Components of system 200 are interconnected via a mesh network, so that each component can communicate directly with another. In some alternative embodiments of the invention, other internal communication links may be employed within system 200, such as an Ethernet-type local area network or intranet.

In some embodiments of the invention, to support simultaneous interaction of communication servers 202 with client devices and communications among system components, communication servers 202 include at least two communication interfaces. A first interface (e.g., a public interface) is exposed for user connections, while a second interface (e.g., a private interface) is reserved for communications within system 200.

In addition, in some embodiments, a communication server may be able to host secure communications using SSL (Secure Sockets Layer), TLS (Transport Layer Security) or some other secure communication protocol or security scheme, in addition to non-secure protocols. When a communication server issues a notification to an off-line user's communication device, it may include addresses (e.g., including port numbers) for establishing secure and/or non-secure communication connections. When it receives such a notification, the device may connect to one or the other, depending on whether it is configured to support secure connections, whether the user has expressed a preference for one over the other, etc.

Figure 3:
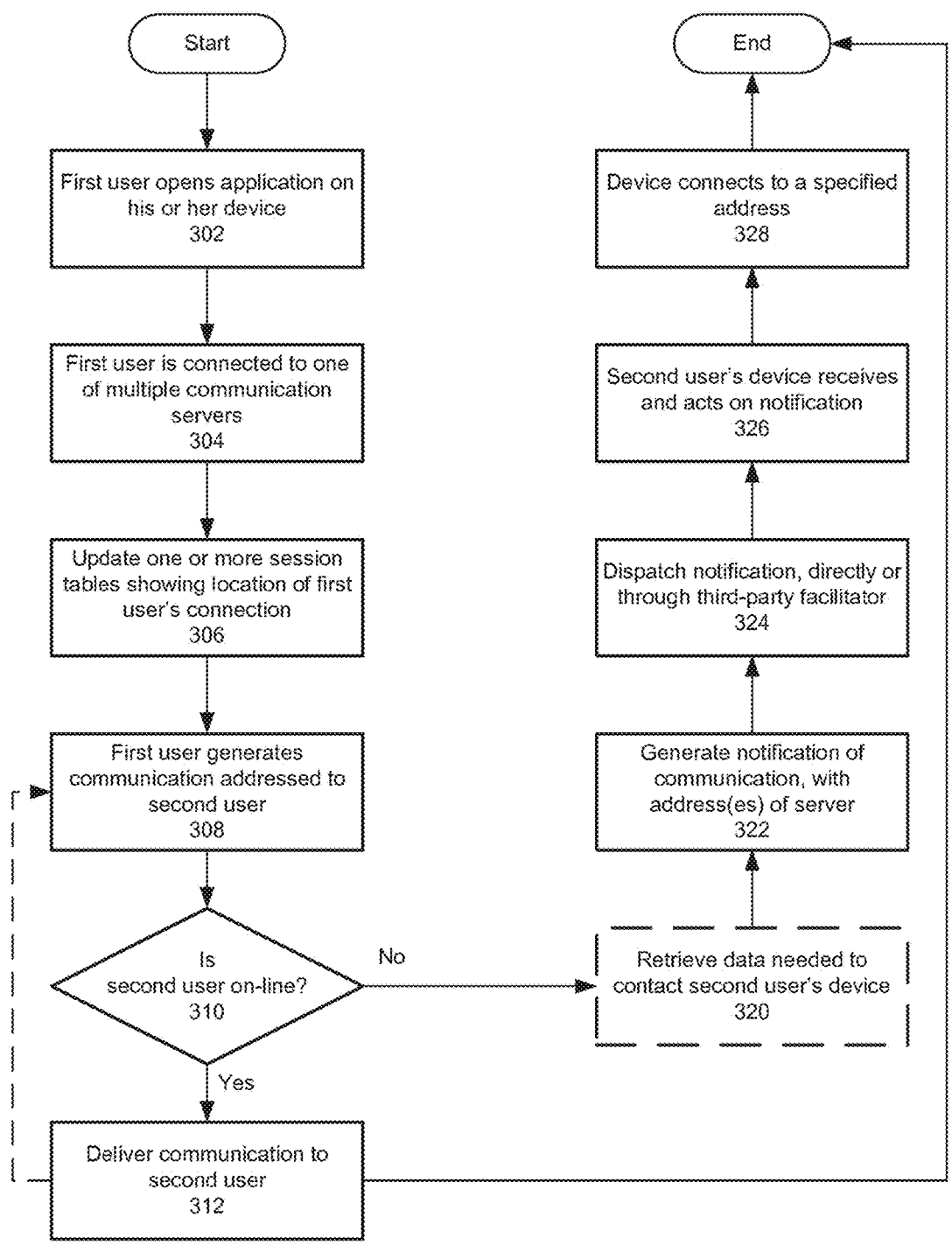
FIG. 3 is a flow chart demonstrating a method of aggregating communication connections, according to some embodiments of the invention.

FIG. 3 is a flow chart demonstrating a method of aggregating communication connections, according to some embodiments of the invention. In these embodiments, the communication connections are established between user devices (e.g., smart phones, computers) and a system that provides a distributed communication application for which client software executes on the devices. The communication application supports group chat or group instant messaging, private chat, on-line conferencing, electronic mail and/or other forms of communication (e.g., text messages, telephone calls, document sharing).

In operation 302, a first user opens the application on his communication device. Depending on the device's configuration (e.g., its operating system), the application may have been dormant beforehand, or may have been minimized or operating in the background instead of executing as the primary or foreground application.

In operation 304, the device (e.g., the application) connects to the system hosting the application. This may involve a DNS lookup of a name associated with the application (e.g., host.whatsapp.net), which may return multiple addresses, each of which corresponds to a front-end component (e.g., a communication server) of the system. The device may randomly pick one, or pick the first one listed, or choose one in some other way, and issue a connection request via http, https or some other protocol.

In operation 306, the system updates one or more session tables, routing tables or other data structures to identify the user's termination point within the system. For example, a session table within the communication server that the user is connected to will be updated to reflect the user's presence on that server. A global session table replicated across multiple state servers or stored in some other location may also be updated accordingly.

In operation 308, the first user sends the system a communication addressed to at least one other user (a second user). Although the illustrated method is described as it will be performed for one destination user, the operations described here may be repeated for any number of additional destination users.

In operation 310, the system determines whether the addressee of the communication is on-line. If the second user is on-line, the method continues with operation 312; otherwise, the method advances to operation 320.

In operation 312, the communication server that received the new communication delivers or routes it to the addressee, via her connection to the system. If the addressee is connected to a different communication server, the communication will be routed via the system (e.g., via a private communication interface). After operation 312, the method ends or returns to operation 308 (e.g., if the first user issues additional communications).

In optional operation 320, the communication server hosting the first user's connection retrieves data (e.g., from a state server) that will be used to contact the off-line destination user's client device. The data may include a device token associated with the addressee (or with the addressee's device) by a service provider or by a provider of the device or some component of the device (e.g., an operating system), plus the user's telephone number, network address, telephone carrier, etc. This operation may be optional because the communication server may already possess the information if, for example, the information was included in the communication or cached at the communication server.

In operation 322, the communication server creates a wake-up to be sent to the device, using the information received in operation 320 if necessary. The message identifies the application (i.e., the client application logic installed on the device), and session (e.g., chat session or chat group) if necessary, and provides an address or other identifier of a preferred system component to connect to.

In particular, the address(es) included in the wake-up message include at least one address of the communication server to which the first user is connected. Multiple addresses of that server may be included (e.g., for connecting with different communication protocols or via different communication interfaces), and an address of another server may also be provided. For example, if a mutual associate of the first user and the second user is connected to a different communication server, an address of that server may be included in the message. In the illustrated embodiment, a mutual associate of the first user and the second user is a user with whom both users are corresponding, perhaps within a group chat session.

In operation 324, the alert or wake-up message is transmitted toward the destination user's client device. Depending on the type of device (e.g., device platform), the message may be sent directly or may be relayed via a third-party facilitator.

In operation 326, the addressee's device (e.g., the device's operating system) receives and processes the alert, opens the application and delivers the message. The application then initiates a connection to the system if the user allows or specifies such action, or if such action is not suppressed. Illustratively, the user may be notified by the device that a new communication has been received, and leave it to the user to decide whether or not to connect immediately.

In operation 328, when the application via the addressee's device connects to the system, it connects to an address specified in the wake-up message. If there were multiple addresses, it may select one to connect to based on a communication protocol associated with the address/port, may select an address associated with a secure (or non-secure) connection if a user preference or application configuration calls for such a connection, or may select the first one, the last one or make a random selection.

If the second user receives multiple alerts regarding new communications while off-line, with different addresses to connect to, the second user's device may simply connect to the first one it received, the last one, the one that was identified most frequently, etc. The device (e.g., the application) may apply some intelligence to determine which communication session was most active or has the most participants on-line and connected to a single server, and therefore connect to an address of that server.

After operation 328, the illustrated method ends, but the system retrieves the communication for the user and facilitates the further exchange of communications between the associated users. If the communication had additional off-line addressees, they may also connect to the same server.

In other embodiments of the invention, operations of the method of FIG. 3 may be performed in some other order, and may be combined or further subdivided.

The environment in which some embodiments of the invention are executed may incorporate a general-purpose computer or a special-purpose device such as a hand-held computer or communication device. Details of such devices (e.g., processor, memory, data storage, display) may be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method, comprising:
receiving an alert message at a client device from a communication system, the alert message indicating that a communication for the client device has been received at the communication system from a second client device;
opening a messaging application on the client device in response to the alert message;
connecting the client device to the communication system at an address included in the alert message; and
receiving the communication via the connection, wherein the address included in the alert message is the address of a communication server connected to the second client device that sent the communication to the communication system;
wherein the alert message is received when the client device is off-line from the communication system.

2. The method of claim 1, wherein the alert message includes a plurality of addresses, the method comprising:
selecting one address of the plurality of addresses; and
connecting to the communication system at the selected address.

3. The method of claim 2, comprising:
selecting the one address according to a communication protocol used at the selected address, a security of a port at the selected address, a first address in the alert message, a last address in the alert message, or a randomly selected address from the plurality of addresses.

4. The method of claim 1, comprising:
receiving a plurality of alert messages, each alert message comprising one or more addresses and associated with a different communication session;
opening the messaging application in response to the alert messages;
selecting one alert message; and
connecting to the communication system at an address from the selected alert message.

5. The method of claim 4, comprising:
selecting an alert message according to a first received alert message, a last received alert message, an activity level of the communication session associated with the alert message, or a number of participants in the communication session associated with the alert message that are connected to a same server in the communication system.

6. An apparatus, comprising:
a processor;
a communication interface to:
receive an alert message from a communication system, the alert message comprising an address, the alert message indicating that communication for the client device has been received at the communication system from a second client device, the alert message received while the apparatus is off-line from the communication system; and
client application logic operative on the processor to:
connect to the communication system at the address in response to the alert message; and
receive the communication via the connection, wherein the address included in the alert message is the address of a communication server connected to the second client device that sent the communication to the communication system.

7. The apparatus of claim 6, wherein the alert message includes a plurality of addresses, the client application logic operative to:
select one address of the plurality of addresses; and
instruct the communication interface to connect to the communication system at the selected address.

8. The apparatus of claim 7, the client application logic operative to select the one address according to a communication protocol used at the selected address, a security of a port at the selected address, a first address in the alert message, a last address in the alert message, or a randomly selected address from the plurality of addresses.

9. The apparatus of claim 6, the communication interface operative to receive a plurality of alert messages, each alert message comprising one or more addresses and associated with a different communication session; and the client application logic operative to select one alert message and instruct the communication interface to connect to the communication system at an address from the selected alert message.

10. The apparatus of claim 9, the client application logic operative to select an alert message according to a first received alert message, a last received alert message, an activity level of the communication session associated with the alert message, or a number of participants in the communication session associated with the alert message that are connected to a same server in the communication system.

11. A non-transitory computer-readable medium storing instructions that, when executed by a processor, cause the processor to:
receive an alert message from a communication system while offline from the communication system, the alert message identifying a client messaging application and comprising an address, the alert message indicating that a communication for the client device has been received at the communication system from a second client device;
opening the client messaging application in response to the alert message;
connect to the communication system at the address; and
receive the communication via the connection, wherein the address included in the alert message is the address of a communication server connected to the second client device that sent the communication to the communication system.

12. The computer-readable medium of claim 11, comprising further instructions that, when executed, cause the processor to:
select one address of a plurality of addresses when the alert message includes a plurality of addresses; and connect to the communication system at the selected address.

13. The computer-readable medium of claim 12, comprising further instructions that, when executed, cause the processor to:
   select the one address according to a communication protocol used at the selected address, a security of a port at the selected address, a first address in the alert message, a last address in the alert message, or a randomly selected address from the plurality of addresses.

14. The computer-readable medium of claim 11, comprising further instructions that, when executed, cause the processor to:
   receive a plurality of alert messages, each alert message comprising one or more addresses and associated with a different communication session;
   select one alert message; and
   connect to the communication system at an address from the selected alert message.

15. The computer-readable medium of claim 14, comprising further instructions that, when executed, cause the processor to:
   select an alert message according to a first received alert message, a last received alert message, an activity level of the communication session associated with the alert message, or a number of participants in the communication session associated with the alert message that are connected to a same server in the communication system.

* * * * *